US012705233B2

(12) United States Patent
Mishra et al.

(10) Patent No.: US 12,705,233 B2
(45) Date of Patent: Aug. 11, 2026

(54) DIVIDE-AND-CONQUER PROMPT FOR LLM-BASED TEXT-TO-SQL CONVERSION

(71) Applicant: Zscaler, Inc., San Jose, CA (US)

(72) Inventors: Anjul Mishra, Bengaluru (IN); Hriday Purohit, New Brunswick, NJ (US); Hanchen Xiong, London (GB); Priya, Bengaluru (IN); Rex Shang, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 0 days.

(21) Appl. No.: 18/742,119

(22) Filed: Jun. 13, 2024

(65) Prior Publication Data

US 2025/0328525 A1 Oct. 23, 2025

(30) Foreign Application Priority Data

Apr. 23, 2024 (IN) ............................ 202441032011

(51) Int. Cl.
*G06F 16/2452* (2019.01)
*G06F 16/242* (2019.01)

(52) U.S. Cl.
CPC ...... *G06F 16/24522* (2019.01); *G06F 16/243* (2019.01)

(58) Field of Classification Search
CPC ......................... G06F 16/24522; G06F 16/243
See application file for complete search history.

(56) References Cited

U.S. PATENT DOCUMENTS

| | | | |
|---|---|---|---|
| 7,253,606 B2 | 8/2007 | Loh et al. | |
| 10,713,252 B1 * | 7/2020 | Bourne | G06F 16/9024 |
| 11,475,368 B2 | 10/2022 | Shang et al. | |
| 11,669,779 B2 | 6/2023 | Lin et al. | |
| 11,785,022 B2 | 10/2023 | Ma et al. | |
| 2007/0022323 A1 | 1/2007 | Loh et al. | |
| 2019/0251476 A1 | 8/2019 | Shiebler et al. | |
| 2021/0049413 A1 | 2/2021 | Ma et al. | |
| 2021/0377303 A1 | 12/2021 | Bui et al. | |
| 2021/0377304 A1 | 12/2021 | Ma et al. | |
| 2021/0392146 A1 | 12/2021 | Lin et al. | |
| 2022/0067581 A1 | 3/2022 | Kumar et al. | |
| 2022/0083661 A1 | 3/2022 | Ma et al. | |
| 2023/0115982 A1 | 4/2023 | Lin et al. | |
| 2023/0254318 A1 | 8/2023 | Hu et al. | |
| 2023/0353587 A1 | 11/2023 | Bui et al. | |
| 2023/0370495 A1 | 11/2023 | Desai et al. | |
| 2023/0376592 A1 | 11/2023 | Ma et al. | |
| 2024/0028721 A1 | 1/2024 | Ma et al. | |

(Continued)

*Primary Examiner* — Khanh B Pham
*Assistant Examiner* — Ranjit P Doraiswamy
(74) *Attorney, Agent, or Firm* — Baratta Law PLLC; Lawrence A. Baratta, Jr.

(57) ABSTRACT

Systems and methods for processing search queries are provided. A method, according to one implementation, includes a step of receiving a query from a user interface, the query including one or more questions or commands pertaining to datasets stored in a relational database. The method also includes a step of generating a prompt having instructions related to how a Large Language Model (LLM) is to handle a complex query having one or more cascading dependencies. Also, the method includes a step of providing the prompt, datasets, and query to an LLM with instructions to convert the query into Structure Query Language (SQL) code.

20 Claims, 11 Drawing Sheets

(56) References Cited

U.S. PATENT DOCUMENTS

| | | | | |
|---|---|---|---|---|
| 2024/0143584 | A1 * | 5/2024 | Birru | G06F 16/243 |
| 2024/0202539 | A1 * | 6/2024 | Poirier | G06N 3/045 |
| 2024/0394251 | A1 * | 11/2024 | Brende | G06F 11/3409 |

* cited by examiner

PUBLIC CLOUD SERVICE

PRODUCTION ENVIRONMENT

502

CLIENT

1

4

5

504

UI

514

PUBLIC LLM

512

GENERATIVE AI PLATFORM

PROMPT

2

/zsapi/v1/reportData/web
/zsapi/v1/topData
/zsapi/v1/transactionData

IN-HOUSE LLM

516

3

510

VECTOR DATABASE

CA

SM

506

508

600

602

STORE

| Store_key | City | Region |
|---|---|---|
| 1 | New York | East |
| 2 | Chicago | Central |
| 3 | Atlanta | East |
| 4 | Los Angeles | West |
| 5 | San Francisco | West |
| 6 | Philadelphia | East |
| ⋮ | ⋮ | ⋮ |

604

PRODUCT

| Product_key | Description | Brand |
|---|---|---|
| 1 | Beautiful Girls | MKF Studios |
| 2 | Toy Story | Wolf |
| 3 | Sense and Sensib... | Parabuster |
| 4 | Holiday of the Year | Wolf |
| 5 | Pulp Fiction | MKF Studios |
| 6 | The Juror | MKF Studios |
| 7 | From Dusk Til Dawn | Parabuster |
| 8 | Hellraiser: Bloodline | Big Studios |
| ⋮ | ⋮ | ⋮ |

606

SALES_FACT

| Store_key | Product_key | Sales | Cost | Profit |
|---|---|---|---|---|
| 1 | 6 | 2.39 | 1.15 | 1.24 |
| 1 | 2 | 16.70 | 6.91 | 9.79 |
| 2 | 7 | 7.16 | 2.75 | 4.40 |
| 3 | 2 | 4.77 | 1.84 | 2.93 |
| 5 | 3 | 11.93 | 4.59 | 7.34 |
| 5 | 1 | 14.31 | 5.51 | 8.80 |
| ⋮ | ⋮ | ⋮ | ⋮ | ⋮ |

FIG. 6

DIVIDE-AND-CONQUER PROMPT FOR LLM-BASED TEXT-TO-SQL CONVERSION

FIELD OF THE DISCLOSURE

The present disclosure relates generally to networking and computing. More particularly, the present disclosure relates to systems and methods for a divide-and-conquer prompt approach for Large Language Model (LLM)-based text-to-Structured Query Language (SQL) translation.

BACKGROUND

Creating customized reports from logs can become extremely difficult when logs include large amounts of data. Cloud-based systems can have transaction logs which include trillions of transactions with hundreds of millions of transactions being logged each day. Traditionally, users are required to spend a large amount of time selecting various filters and waiting for the logs to load to sort through the trillions of log data entries to get to the desired information. A system for creating customized reports is needed to allow users to easily receive desired data in a requested format. The present disclosure provides systems and methods for a natural language interface for querying logs in a cloud-based system.

BRIEF SUMMARY

The present disclosure provides systems and methods for a natural language interface for querying logs in a cloud-based system. Filtering through data associated with a cloud-based system can be extremely difficult. This is because cloud-based system logs can contain over 300 billion transactions or more every day. Because of the sheer size of these transaction logs, it is difficult to produce customized reports with specific data. Also, log queries require some expertise in a user, e.g., knowledge of SQL. In various embodiments, the systems and methods include training and utilizing a machine learning system that is adapted to convert natural language into a visualization of desired data. More particularly, the present systems and methods convert natural language into various filters necessary for creating a customized report from the log data.

The present disclosure is further directed to systems and methods for performing a search query. In one implementation, a method includes the step of receiving a query from a user interface, whereby the query includes one or more questions or commands pertaining to datasets stored in a relational database. Also, the method includes a step of generating a prompt having instructions related to how a Large Language Model (LLM) is to handle a complex query having one or more cascading dependencies. The method further includes a step of providing the prompt, datasets, and query to an LLM with instructions to convert the query into Structure Query Language (SQL) code.

In some embodiments, the LLM may be configured to apply the SQL code to the relational database to obtain one or more answers to the query. The query, for example, may be related to a specific subject, whereby the method may further include a step of obtaining a set of tables related to the specific subject from the relational database.

Also, according to some implementations, the method may further include a step of determining if the query is complex. In response to determining that the query is not complex, the method may further include a step of providing a simple prompt to the LLM. In response to determining that the query is complex, the method may further include a step of adding an instruction to the prompt to direct the LLM to adopt a divide-and-conquer strategy for handling the complex query. For example, the divide-and-conquer strategy may be configured to direct the LLM to a) break down the complex query into sub-questions, b) extract dependencies from the sub-questions, c) convert each sub-question into a sub-SQL script, and d) based on the dependencies and sub-SQL scripts, formulate a final SQL that will provide correct answers to the complex query.

The prompt, for example, may include intermediate reasoning steps to enable the LLM to handle a complex query. The method, in some embodiments, may further includes a step of modifying the prompt to instruct the LLM to behave in one or more of the following ways: a) act as expert for translating the query into the SQL code, b) follow a step by step approach, and c) use a Chain of Thought (CoT) technique. Also, the method may include a step of using Natural Language Processing (NLP) on the query received from the user interface.

BRIEF DESCRIPTION OF THE DRAWINGS

The present disclosure is illustrated and described herein with reference to the various drawings, in which like reference numbers are used to denote like system components/method steps, as appropriate, and in which:

FIG. 6 is a diagram illustrating an example of a set of related tables used for describing the systems and methods of the present disclosure.

DETAILED DESCRIPTION

Figure 1:
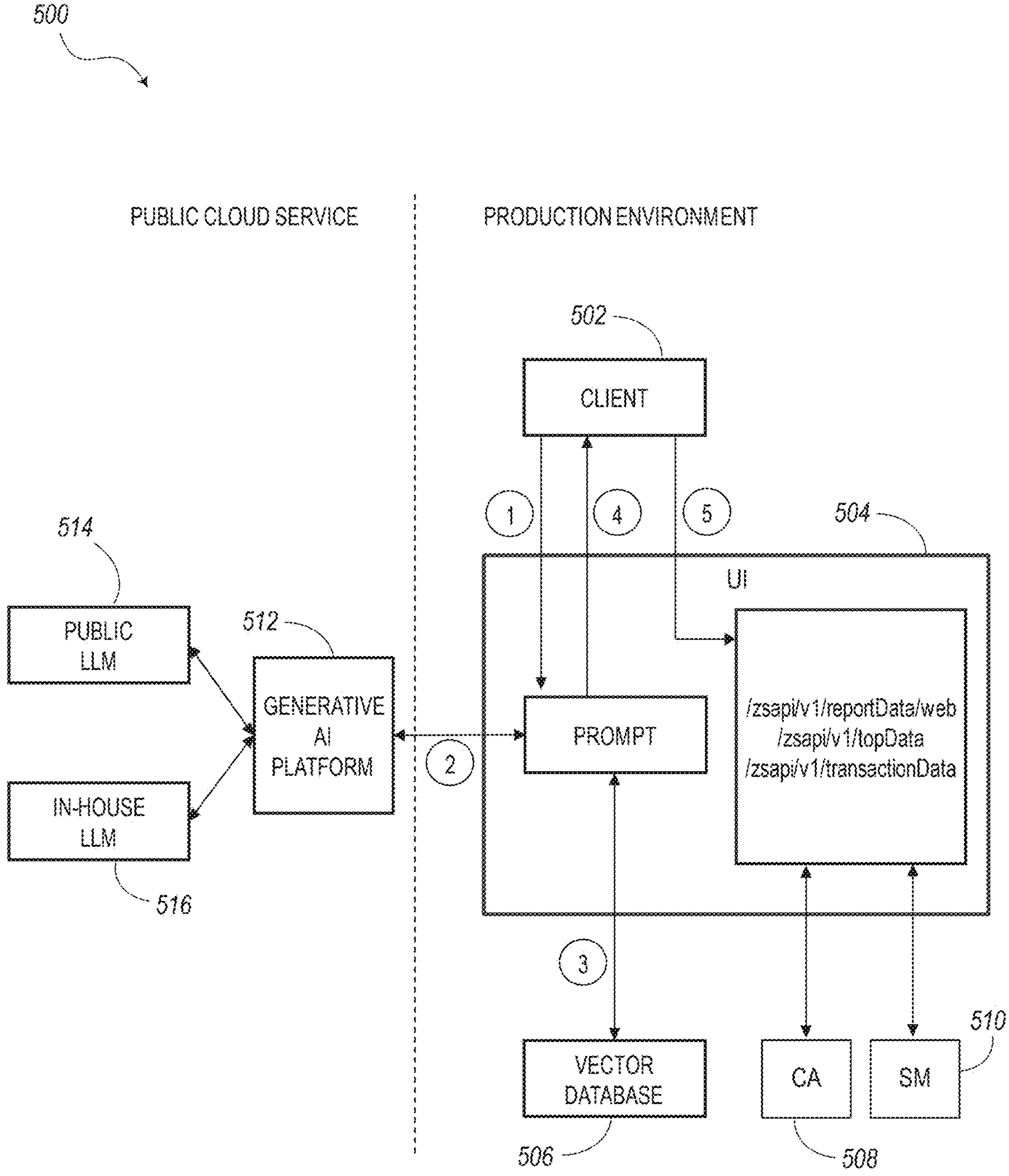
FIG. 1 is a flow diagram for a natural language interface for querying logs in a cloud-based system.

Again, the present disclosure relates to systems and methods for a natural language interface for querying logs in a cloud-based system. The present systems are adapted to take a natural language string provided by the user by way of one or more methods, and after converting it into a format that is understandable by the log, provide the converted input to the log. The log is then adapted to provide the customized report based on the natural language string, and provide a graphical representation based on a requested format.

Natural Language Interface for Querying Loss

The present disclosure provides systems and methods for a natural language interface for querying logs in a cloud-based system. Filtering through data associated with a cloud-based system can be extremely difficult. This is because cloud-based system logs can contain over 300 billion transactions every day. Because of the sheer size of these transaction logs, it is difficult to produce customized reports with specific data. In various embodiments, the systems and methods include training and utilizing a machine learning system that is adapted to convert natural language into a visualization of desired data.

More particularly, the present systems and methods convert natural language into the various filters necessary for creating the customized report. That is, the machine learning model is adapted to take the natural language input and convert it in such a way as to allow the log to understand the request. The subsequent visualization includes the specific data requested by the user in the format requested by the user. In various embodiments, the present systems provide a User Interface (UI) for allowing users to provide the inputs and for providing the visualizations based on the inputs.

In an example use case, a user may want to create a customized report from the log data. For example, a user may want to determine how many users have accessed a specific application on a specific day. Traditionally, a user would have to spend a large amount of time selecting various filters and waiting for the logs to load to sort through the trillions of log data entries to get the desired information. Again, this is extremely time consuming because of the amount of log data experienced by cloud-based systems.

In an embodiment, the present systems are adapted to take a voice input for providing the model with the natural language input. That is, the present systems include a UI which includes a voice input feature. Alternatively, a user can type the natural language input in a search bar, select a recommended input, and/or select a previously used input. Recommended inputs can be inputs that the system recommends to users based on the popularity of previous searches.

The model is adapted to take the natural language string provided by the user by way of the aforementioned methods, and after converting it into a format that is understandable by the log, provide the converted input to the log. The log is then adapted to provide the customized report based on the natural language string, and provide a graphical representation based on a requested format. The requested format can be part of the natural language string provided by the user.

More particularly, the system uses the natural language input to determine what type of graphical representation the output should be structured as. For example, a user can provide a natural language input of "show me a pie chart of the top one hundred client IPs for today in bytes" and the system will provide a pie chart of the top 100 IPs (or other quantitative amount) used today in bytes.

Again, the system is adapted, via the UI, to provide suggestions for customized reports. These suggestions can be based on historically popular requests and the like.

In an embodiment, the system is further adapted to provide a display of the filters used to create the customized report. That is, after the report is created, the system shows what filters were applied to the log based on the natural language input. In an embodiment, the systems are further adapted to allow a user to provide feedback based on the filters the system provided to the log. For example, a user can inspect the filters and indicate if they are accurate or not, allowing the model to be further trained to become more accurate.

Natural Language Interface for Cloud-Based Query

FIG. 1 is a flow diagram illustrating an embodiment of a process 500 using a natural language interface for querying logs in a cloud-based system. The process 500 includes a production environment and a public cloud service. In the production environment, the process 500 involves actions by a client 502, a UI 504, a vector database 506, a Central Authority (CA) 508, and a Service Manager (SM) 510. In this embodiment, the public cloud service includes a generative AI platform 512 (on the public cloud, an AI service 514 (e.g., Azure OpenAI service), and one or more in-house Large Language Models (LLMs) 516.

In a first step, a client 502 (or user) can provide a prompt (or request) to an API prompt portion of the UI 504. The client 502 may input a natural language prompt into the system via various input methods described herein. Alternatively, the client 502 may enter a query or request in textual form within an input box. If needed, the API prompt portion converts the natural language to an input that the log can use to provide a customized report.

In a second step, the API prompt portion can turn (or convert) the prompt into a generic/API request, with no customer information and provide the prompt to the generative AI platform 512. The model of the generative AI platform 512 can be used for converting the natural language in the public cloud service, such as the AI service 514 or the in-house LLMs 516.

In a third step, the API prompt portion may work with the vector database 506 to turn filter values from "generic" requests to vectors and find a closest matched ID. In a fourth step, the API prompt portion can build an API request for the client 502. In a fifth step, the client 502 may work with an API request portion of the UI 504 to create the API request.

The API request portion along with a top data portion and report portion of the UI 504 interact with the CA 508 and SM 510. Also, the CA 508 may provide a batch process with respect to the vector database 506, such as embedding strings that are client-specific to vectors. A build vector can be used to obtain an ID map. Thus, the UI 504 is configured to provide a visualization of the customized report to the client 502.

With respect to Natural Language Processing (NLP), a "chat" module may be used for converting natural language into text. In some embodiments, the process 500 may include using chat techniques to create insights into the status of the web, which may include user transactions on a network, data traffic, or other network conditions. The UI may then provide "insights" into the network or web.

Regarding privacy, the user (e.g., client 502) may provide the following request or prompt, "Show me the transactions from George P. Burdell for the last 2 days." In the case of ChatGPT, the embodiments described herein may be configured to build a Personally Identifiable Information (PII) model to identify and filter the name "George P. Burdell." With the in-house LLMs 516 or other suitable database, this would not typically be a concern.

Data Retrieval System

Figure 2:
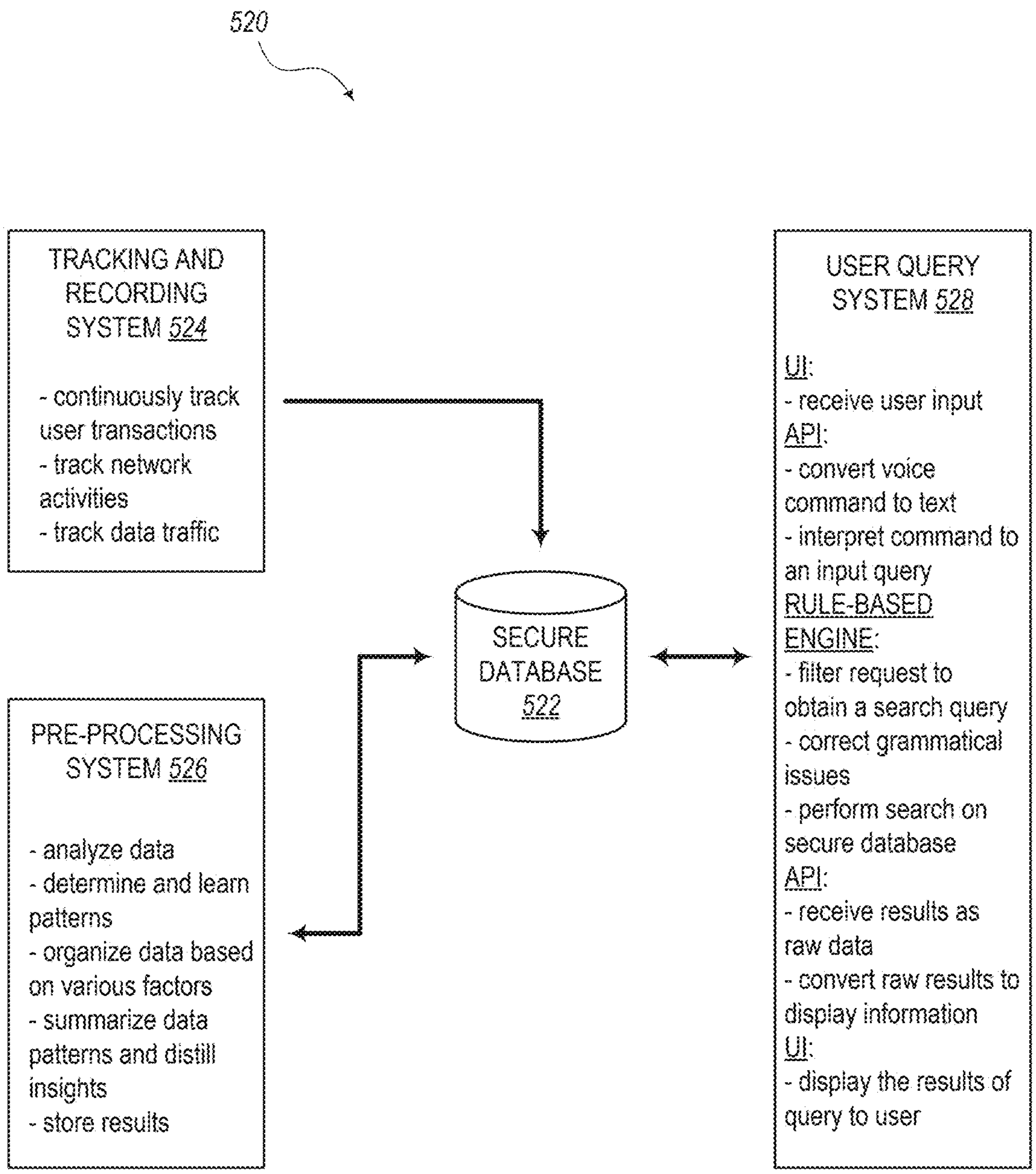
FIG. 2 is a block diagram illustrating an embodiment of a data retrieval system.

FIG. 2 is a block diagram illustrating an embodiment of a data retrieval system 520. In this embodiment, the data retrieval system 520 includes a secure database 522, such as LLM, private database, or other suitable data storage device for storing network transaction, organized factors with respect to the data, web insights, etc. According to the embodiments of the present disclosure, the secure database 522 may include information that is only accessible by user, employees, admin personnel, etc. within an enterprise. It some embodiments, the secure database 522 may benefit from various security services (e.g., those services provided by Zscaler, the assignee of the present application, or any other service provider).

Also, the data retrieval system 520 includes a tracking and recording system 524, which may be configured to continuously track user transactions within a network, subnetwork, enterprise domain, autonomous system, etc. The tracking and recording system 524 may track transactions, network activities, data traffic, and/or other relevant information representing actions within the network under test. Then, the tracking and recording system 524 can store this data in the secure database 522. In some embodiments, the tracking and recording system 524 may be part of a network security software product.

Furthermore, the data retrieval system 520 may also include a pre-processing system 526. The pre-processing system 526, for example, may be configured to analyze the data stored in the secure database 522 and detect certain patterns in the data and learn (e.g., using Machine Learning (ML), Artificial Intelligence (AI), or the like) these patterns with regard to various factors. The pre-processing system 526 can organize the data based on certain factors (e.g., using classification strategies or supervised learning techniques). Also, the pre-processing system 526 can create summaries regarding various learned patterns and create or distill various insights which might be useful for enabling an admin to monitor the status of the network. The results, patterns, insights, etc. can also be stored in the secure database 522 with suitable links to a classification of possible queries about the network.

The data retrieval system 520 also includes a user query system 528, which allows a user (e.g., admin) to enter a search query and receive results of the query in graphical form (e.g., on a UI). The user query system 528 may be configured to use a UI to receive a user input, which may include entries provided in textual form in an input box and/or provided in audible form using a Generative Pre-trained Transformer (GPT), such as GPT-4, a chat program (e.g., ChatGPT), an NLP function, voice interactions, conversational UI, OpenAI, Stanford Core NLP library, etc.

Using an Application Programming Interface (API), the user query system 528 may be configured to convert any voice commands to text. Also, the API can interpret commands written in conversational form to an input query that can be understood by a processor. Next, a rule-based engine may be used to filter the request to obtain a search query.

Among other types of filters, the search query may firstly include a "timeframe" having a range of time during which user transactions or other network activity events were recorded in the secure database 522 by the tracking and recording system 524. For example, the user may request records obtained received that very day ("today"), records obtained the previous week ("last week"), records obtained during a certain range (e.g., "May 5$^{th}$ through May 23$^{rd}$"), etc.

Also, the search query may secondly include the type of data being requested, such as "client IP addresses," "the most frequently visited websites," etc. and/or activity by a particular person, activity by a particular department, traffic with respect to a specific website or group of websites, etc.

The search query may thirdly include certain specific restrictions, limitations, characteristics, etc. about the request, such as "the top 10 . . . ," " . . . in bytes," " . . . by department," etc. Fourthly, the search query may include a request for how the retrieved data is presented to the user. This may include, for example, a request to show the data "in a pie chart," "in a bar graph," "in a table," etc. The rule-based engine of the user query system 528 may be configured to filter the request according to other criteria as well.

In some embodiments, the rule-based engine may also be configured to correct grammatical issues to produce a request that can be understood by a computer. For example, the rule-based engine may be configured to remove um's, you-know's, etc. and automatically make changes based on known patterns in the secure database 522. For example, if the rule-based engine interprets audio as "invites," it may be able to correct to a request that makes more sense in its context, such as by changing "invites" to "in bytes." Once the request is taken apart to retrieve various filtered portions of the request and correct for grammatical issues, the rule-based engine can then perform a search on the secure database 522.

Then, the user query system 528 is configured to allow the results of the search (by the rule-based engine) to be provided back to the API. The API may receive the results as raw data and then convert the results to a format that can be displayed on the UI. The UI may then display the query results to the user according to the user's request.

Thus, according to various embodiments, the present disclosure includes:

1) an NLP engine for querying logs stored in a secure database, which may include hardware (e.g., data retrieval system 520, user query system, etc.) configured to retrieve securely organized logs (e.g., using network security processes, such as those provided by a cloud service provider), convert the logs to a display format that a user can understand, and then present results to a user on a suitable UI; and
2) UI workflow for allowing a user (admin) to enter a search query using natural language and then see the results presented on a suitable display device.

The embodiments are related to using Natural Language Processing (NLP) to interact with securely managed logs (e.g., cloud service provider logs) from one or more secure databases (e.g., secure database 522). The embodiments of the present disclosure are configured in contrast to conventional systems. Although anyone can run a report, it should be noted that complex systems, such as an enterprise domain, usually include a complexity that would require the expertise of a skilled technician, network operator, admin, etc. However, conventional systems normally require the user to drill down through multiple levels of interfaces to get to the desired information. Therefore, by allowing natural language input requests and interpretation/filtering of requests in a logical process, the user can more easily make requests that can be interpreted by the systems and methods described herein. If the request brings up information that the user did not intend, the user can easily see where the interpretation may have veered from the user's request and rephrase the request and/or add additional request criteria. Also, with the pre-processing of data, the systems of the present disclosure can organize the data in an anticipatory manner by classifying possible requests based on the records or logs recorded.

One goal is to take the natural language requests and convert them to queries that can be processed. This would allow an operator to interact without the expertise in the log system. It may be noted that various embodiments may be associated with databases that are isolated from the general public in order to avoid hackers from retrieving data that may be sensitive. Therefore, the user query system 528 may be configured with various security software running in the cloud to allow a network operator or administrator associated with an enterprise to be able to search network status results for one or more databases that store logs, records, data, etc. of that enterprise. Thus, the search queries will be configured to stay within the realm of the enterprise and would not allow outside enquiries.

For example, an enterprise and/or a network security company (e.g., cloud service provider)) may store a large amount of valuable data. In some cases, the network security company may monitor a lot of users, all the time, for a lot of companies. From the data logs, it may be possible to develop various insights into user behavior, productivity, malicious activity, etc. Some queries, for example, may ask, "How many of my employees are on social media at least 30 minutes each day?". This type of information along with other similar searchable events or patterns may be recorded and analyzed behind the scenes without divulging sensitive information to general clients. When these various scenarios are detected, a query in line with the saved scenarios can be quickly retrieved. In addition, even if a query has not been anticipated, a search can be made for one enterprise and may be repeated for the network systems of other enterprises with their respective network activity data.

In operation, a cloud-based system, as well as other devices, services, etc. of the present disclosure, can maintain statistics and logs. As described herein, this can be referred to as log data, and can reside in the log or database, as well as being streamed continuously. That is, the term log data can be either stored data or in-transit data. The log data represents activity by a user device in the cloud-based system. As described herein, the term user device can be any processing device that connects to the Internet and/or cloud services, via the cloud-based system. Also, the user device can be associated with a user, e.g., laptop, desktop, tablet, smart phone, etc., as well as a server or an IoT device.

As described herein, the cloud-based system can maintain the log data, with records used in a backend data store for queries. A record is a collection of tens of thousands of counters. A counter can be a tuple of an identifier (ID) and value. As described herein, a counter represents some monitored data associated with the cloud-based system. Of note, the log data is referred to as sparsely populated, namely a large number of counters that are sparsely populated (e.g., tens of thousands of counters or more, and possible orders of magnitude or more of which are empty). For example, a record can be stored every time period (e.g., an hour or any other time interval) in the cloud-based system. There can be millions of active users or more.

In an embodiment, the identifier can be an IP address and a location identifier. The IP address can be IP version 4 (IPv4) or IP version 6 (IPv6) and is unique for each location. The location identifier can be a string (e.g., company X HQ, San Jose Wi-Fi, etc.). This combination (i.e., IP address and location identifier) can be a universally unique identifier (UUID). However, as described herein, the IP address can be assigned to a different device over time. The present disclosure addresses this issue, namely after a break in log entries and new log entries.

Examples of the log data can be the Nanolog system from Zscaler, Inc., the applicant. Also, such data is described in a) commonly-assigned U.S. Pat. No. 8,429,111, issued Apr. 23, 2013, and entitled "Encoding and compression of statistical data," the contents of which are incorporated herein by reference, describes compression techniques for storing such logs, b) commonly-assigned U.S. Pat. No. 9,760,283, issued Sep. 12, 2017, and entitled "Systems and methods for a memory model for sparsely updated statistics," the contents of which are incorporated herein by reference, describes techniques to manage sparsely updated statistics utilizing different sets of memory, hashing, memory buckets, and incremental storage, and c) commonly-assigned U.S. patent application Ser. No. 16/851,161, filed Apr. 17, 2020, and entitled "Systems and methods for efficiently maintaining records in a cloud-based system," the contents of which are incorporated herein by reference, describes compression of sparsely populated log data.

Generative AI

It may be noted that the world is witnessing one of the most profound tipping points in the AI revolution. For example, generative AI may be considered the new norm for how humans will interact with data and computer systems in the future.

ChatGPT is an example of a competent AI model with both APIs and "conversation UI" workflow. In some respects, it may be poised to replace the conventional enterprise software workflow and dashboard paradigm. Currently, there is no way to leverage and integrate emerging technologies such as Generative Artificial Intelligence, NLP, voice interactions, etc. and integrate these technologies with large scale databases, particularly those databases include extremely large amounts of records and logs stored in response to detection of network activities in an enterprise domain, particularly related to network security products offered by a cloud service provider. Thus, the addition of these data retrieval systems and methods, the embodiments described herein are configured to:

1. help customers achieve the most robust and secure digital transformation infrastructure possible; and
2. help enterprises to be more operationally efficient.

Chat functionality may be used as an internal tool built into other network security products to leverage generative AI and natural language models. According to the embodiments described herein, the chat capabilities can also provide more customized and vertical services based on a cloud service provider's use cases. It can serve as a "digital assistant" or a "digital intern" to accelerate analytics tasks that would otherwise take hours for a security admin. Even though it is not intended to replace the roles of a human, it can work around the clock tirelessly to collect data, parse large datasets that may be obtained using web Logs, distill insights, make summaries, etc.

Today, a Web Log table may contain a large amount of data with over 100 columns. A "Web Insights" feature may be adapted to help admins visualize the traffic data in different types of charts/graphs. In some embodiments, there may be a total of 30 different filters available to manually filter the Web Insights data.

Thus, the systems and methods of the present disclosure may be configured to overcome several deficiencies or "pain points" in conventional systems. For example, conventional systems normally require tedious manual efforts on the part of the admin to apply filters one-by-one. The admins would normally be required to understand the search product, which, even still, may require the admin to perform too many clicks to get the answers the admin is looking for. Also, with various hierarchical structures of various search products currently in existence, it may be necessary for a user to drill down many layers to get the information they need. Furthermore, the drill-down processes are not always intuitive in these conventional systems. However, the embodiments of the present disclosure are configured to overcome many of these deficiencies to provide a simple, intuitive platform.

According to some embodiments, the systems described herein may be configured to handle one query at a time. To speed up the query processing function, the request may normally be limited to a certain number of words. Otherwise, it may be difficult to distinguish the key words. Then, after quickly responding to one request, a second query can be entered if clarification is needed. For example, a user may inadvertently ask for a timeframe that he or she might not necessarily be interested in at that time. Therefore, if the results show a different timeframe, the user can rephrase the request and get the results they want.

The systems and methods may utilize the Stanford Core NLP library or other similar technology to optimize the performance, such as by reducing time for keywords to chart processing. Also, the systems and methods may include one or more of the following features:

1) Query Suggestions: Based on pre-processing or requests by other users, the system may add preset and/or commonly used queries for quick analysis; and
2) Saved Queries: The system can save previously searched queries and present these to the users so that they can quickly perform the same query at a later time.

For example, the systems and methods of the present disclosure may apply the following filters for each query:

1) Show the applicable filters that are associated with each query;
2) Voice UI: an alternative to keyboard input;
3) Mic, Record, Stop buttons for voice inputs;
4) Show error states for incorrect queries; etc.

The present disclosure takes generative AI to the next level by allowing enterprises or organizations to ask questions about their own data in the form of queries without any sensitive information leaving their environment. The chat has a potential to dramatically accelerate business workflows. For example, CISOs and CIOs can get some urgent questions answered on a weekend afternoon without bugging their teams.

The chat may be developed to play an increasing role in the environment of network security to deliver a secure digital transformation infrastructure for customers with reliability, availability, and serviceability. The ChatGPT APIs, GPT-4, and various generic and personalized generative AI services may be able to significantly accelerate the missions of network security providers (e.g., cloud service providers) in the future.

Query System

Figure 3:
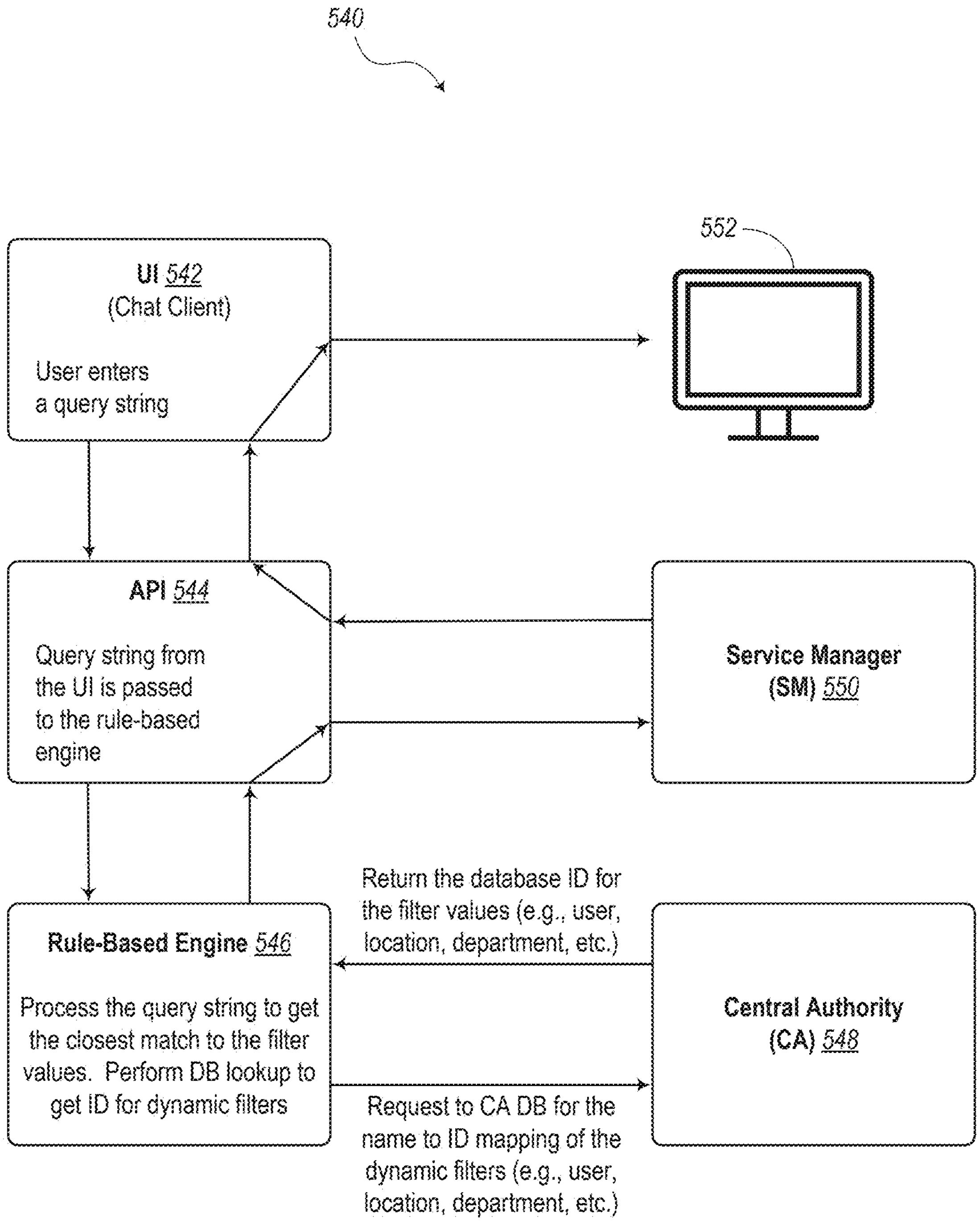
FIG. 3 is a block diagram illustrating an embodiment of a query system.

FIG. 3 is a block diagram illustrating an embodiment of a query system 540. As shown, the query system 540 includes a UI 542, an API 544, a rule-based engine 546, a Certificate Authority (CA) 548, and a Service Manager (SM) 550. The UI 542 (chat client) allows a user to enter a query string. The query string is submitted to the API 544, which is configured to relay it to the rule-based engine 546. The rule-based engine 546 is configured to process the query string to get the closest match to certain filter values. Next, the rule-based engine 546 is configured to perform a database lookup to get an ID for dynamic filters.

The rule-based engine 546 then requests the CA 548 to search its database for the name to the ID mapping of the dynamic filters, which may include a specific user, a specific location, a specific department, etc. The CA 548 then returns the database ID for the filter value to the rule-based engine 546. This information is passed back to the API 544, which may be configured to utilize the SM 550. The API 544 then sends the response to the UI 542, which is configured to present the information in a suitable form, such as a screen display 552 that can be displayed on the UI 542 for the user's viewing.

For example, a cloud service provider can process hundreds of billion user transactions a day. For an admin or network operator, the process of looking up and filtering through specific logs to get insights about what is happening in the network can be cumbersome and time-consuming. Until now, there has been no way to leverage and integrate emerging technologies (e.g., generative AI, NLP, etc.) with various network security products. However, the systems and methods of the present disclosure are configured to provide solutions in this regard to overcome the deficiencies in the conventional systems. Thus, the present disclosure can simplify queries, reduce complexity, eliminate the need for an expert in the operation of various query software products, simplify the process of getting meaningful information from logs by entering simple sentences, help customers (users, admin) to achieve a robust and secure digital transformation infrastructure, help enterprises to operate more efficiently, etc.

Stanford Core NLP enables users to derive linguistic annotations for text, including token boundaries, numeric and time values, parts of speech, named entities, and the like. It helps optimize and process internal objects to improve the query performance and provide faster response for keywords to web insights data processing. Also, the Stanford Core NLP pipeline takes in the query string input from the user and processes it by running a series of NLP embedded models which are trained based on the custom rules provided by the cloud service provider. Core NLP can be an additional module of existing cloud architectures. This helps network security systems to process the customer query string in the cloud. No sensitive information is sent out to any of the public servers. Regarding Web Speech API, a Speech Recognition interface of the Web Speech API may be used to allow a user to enter the query string using their voice instead of typing it.

As an example, an admin of an enterprise can log into a cloud service and navigate to Web Insights to take a peek at the company's traffic and trends. The admin needs to understand the product and apply multiple filters to narrow down to the trend or transaction logs that he wants to look at. This experience is made simpler using the new chat client.

The chat client has the following features and functionalities:

1) Users can search for trends and transactions by entering a query in simple text;
2) Suggested Queries—the system adds a preset list of all the commonly used queries for quick analysis;
3) Previously Searched Queries—the system saves all the previously searched queries. It makes it easier for the user to customize and re-run the queries;
4) Filters Applied—the system provides a view to show the list of filters that were applied for a particular query. This makes it easier for the user to validate the request based on the entered query; and
5) Voice UI—In addition to keyboard input, the user can use his voice to enter the query string. This makes it easier for the user to enter long queries without typing.

Additional Features of the Cloud-Based Query System

It should be noted that the embodiments of the present disclosure are configured to add significant value in the field of data retrieval for an enterprise, particularly for securely retrieving user logs from a secure domain of the enterprise without risking exposure by outside hackers. The present embodiments are configured to take generative AI to the next level by allowing organizations to ask questions about their own data in the form of queries without any sensitive information leaving their environment. Again, the chat has the potential to dramatically accelerate business workflows. For example, CISOs and CIOs can get some urgent questions answered at any time, such as on a weekend afternoon without bugging their teams. The chat may play an increasing role with respect to other security products to deliver a secure digital transformation infrastructure to customers with reliability, availability, and serviceability.

The chat-based report generation may utilize OpenAI. For instance, OpenAI is configured to provide API based integration (e.g., using an API key) and Internet data based non deterministic training model. Also, models can be trained with custom data with OpenAI. Multiple processing techniques may be available, such as text completion, Q/A generation, classification, etc. Also, the models may use keyword extraction techniques.

In some embodiments, the chat features may have use cases that are specific to private databases and particularly to databases that are associated with network security systems and methods to allow only authorized users (admins) to retrieve specific network data.

Conventional systems normally do not include Internet training data that can be used by OpenAI and may not be useful for certain chat requirements. Also, conventional systems may use training data that includes customer data that can be shared over Web and may be exposed to unauthorized users (e.g., hackers). Normally, there is no support for deterministic modeling and keyword tagging. Also, there is currently no support for processing various types of time phrases (e.g., "today," "last week," etc.). Nevertheless, the embodiments of the present disclosure are configured to overcome these deficiencies and provide useful and secure query searching using various filters and aspects to narrow down searches using a timeframe, specific units, display type, etc.

Regarding the Stanford Core NLP library that may be used in the present disclosure, the Core NLP library may be a Java library, may be open source, and may support multiple languages (e.g., Arabic, Chinese, English, French, German, Hungarian, Italian, Spanish, etc.). The Core NLP library may provide Java API integration and may be available on Maven Repo.

The features of this library may include a rule-based deterministic model, may include Name Entity Recognition (NER) and mapping to custom NER tags. Also, the library may include Regular Expression (Regex) rules for defining entities. The library may also include SUTime functionality for time phrase recognition (e.g., "today," "previous month," "last week," etc.).

The embodiments of the query systems and methods described in the present disclosure may include various designs needed to perform the functionality described herein. For example, the systems may include management functionality (e.g., Zmanage) which may include API integrating of the Core NLP library to convert text queries to report requests. Text processing in API may include Regex rules incorporated in a file, which can be created with reporting specific NER tags. Text queries may be processed by the library to generate entities using this rule file. API may then process generated entities to create report requests. Also, the libraries may be configured to support dynamic filters to get dynamic filter entity. API internally gets organization data using other APIs, for instance.

The following filters may be supported in the API:

Top n queries: Web Application, URL Category, Threat Category, Client IP, Threat name, User, Location, Department, Advanced Threat Type, App Class, URL Class, etc.

Search filters: User, Location, Department, Protocol, Client IP, Server IP, Advanced Threat Categories, URL Search, Threat Category, URL Category, SSL Policy Reason, Threat Super Category, URL Class, etc.

Operations supported: Equals, Not equals

It may be noted that, for dynamic filters, values may be enclosed in double quotes, such as users: "user1," "user2," etc.

The embodiments of the present disclosure may use AI/ML in several areas, such as those shown in the main headings. The security models may be configured to catch, on a daily basis, hard-to-detect evasive threats. These models may detect things that most security scanners would not detect.

Intelligent policies incorporated in the present systems and methods may help customers to reduce their lateral propagation risk and improve their segmentation maturity. Also, the present embodiments may have AI/ML models for helping with cloud resiliency, where the systems can proactively detect data center issues, which may be part of a digital experience monitoring service.

Generative AI is a pivotal moment in the AI space. With the systems and methods described herein, customers may be able to embrace generative AI using the query systems. In some cases, innovations may be incorporated in a security platform (e.g., a cloud platform) to perform breach prediction, monitor LLMs, global cloud intelligence, Co-pilot use cases where systems improve productivity and efficiency.

Customers can get Web Insights from a data log. In the past, a user would have to learn how to use the AI depending on what kinds of filters there are and where to find the right filters and then apply it to get the information they need. Now, the systems and methods of the present disclosure are configured to make it easier. That is, a customer can ask questions directly to this conversational UI.

With a request entered in the search box and the user hitting Enter, the LLM is configured to go to work generating the query on the backend. By the way, there may be trillions of user transactions that can be captured, from which the search query pulls from. Currently, there are no other systems in the world that can come close to this capability. Indeed, the query systems of the present disclosure are configured to handle this scale. The systems are built on top of the existing data platform that a cloud provider currently operates. It has been found that the present embodiments are able to already scale to this level.

Search Method

Figure 4:
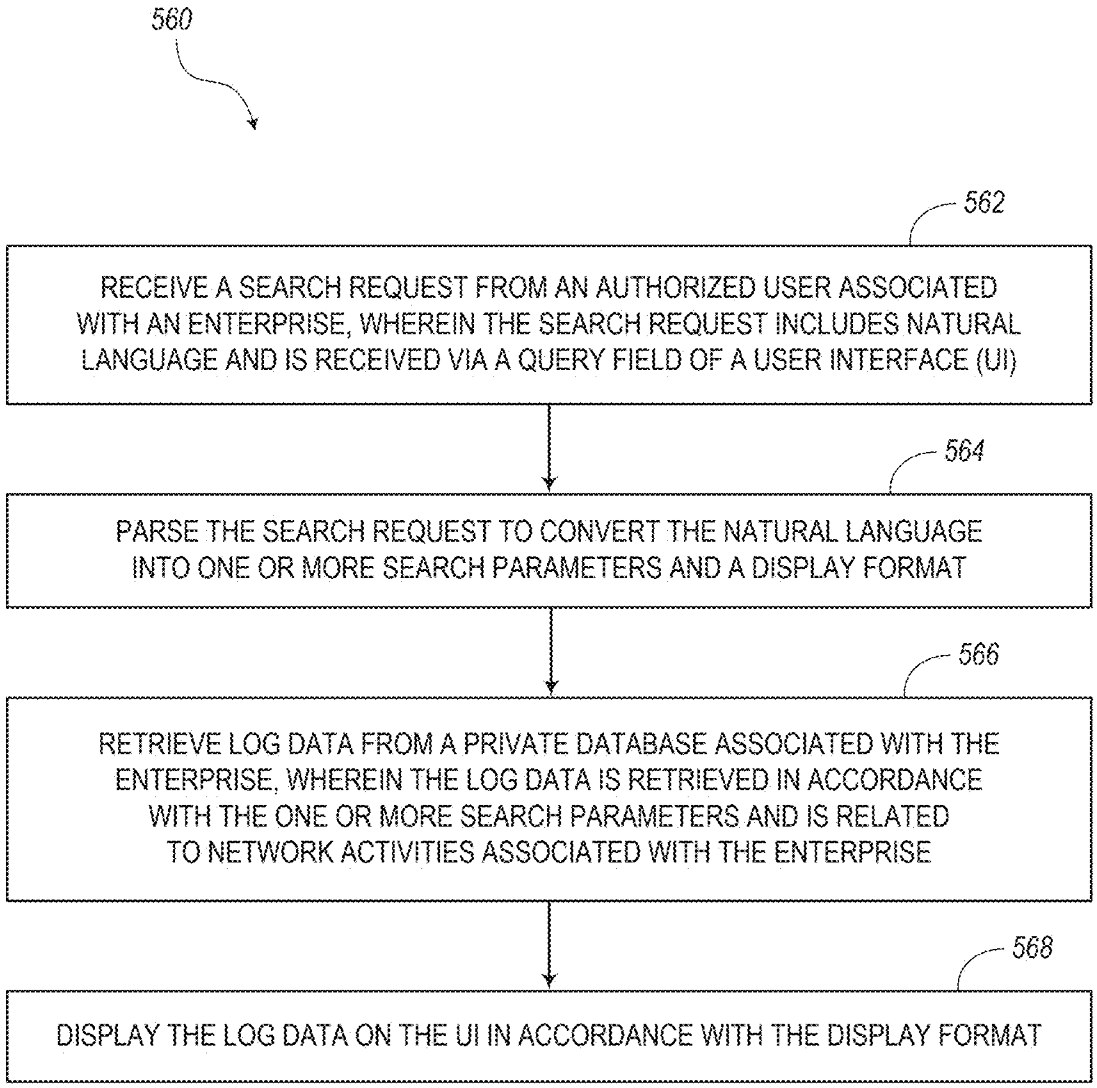
FIG. 4 is a flow diagram illustrating a method for enabling a user to perform a search query.

FIG. 4 is a flow diagram illustrating an embodiment of a method 560 for performing a search query. As shown in FIG. 4, the method 560 includes the step of receiving a search request from an authorized user associated with an enterprise, as indicated in block 562. The search request includes natural language and is received via a query input element (e.g., search query box) of a User Interface (UI). Furthermore, the method 560 includes the step of parsing the search request to convert the natural language into one or more search parameters and a display format, as indicated in block 564. The method 560 also includes the step of retrieving log data from a private database associated with the enterprise, as indicated in block 566. The log data is retrieved in accordance with the one or more search parameters and is related to network activities associated with the enterprise. Also, the method 560 includes the step of displaying the log data on the UI in accordance with the display format, as indicated in block 568.

In some embodiments, the log data may include end user transactions, network security issues, and/or data traffic characteristics. It should be noted that the end users may include any employees and/or contractors associated with the enterprise, where the admin may be distinguished from the end users. Also, the query field of the UI may be configured to receive the search request by one or both of textual input and voice input, and wherein the instructions further cause the one or more processing devices to utilize a Natural Language Processing (NLP) technique for converting the voice input into text.

The one or more search parameters, for example, may include one or more of a timeframe during which the network activities occurred, a type of the network activities, a range of the network activities, and a unit of measure of the network activities. The display format, for example, may include one of a list, a table, a graph, a pie chart, and a bar graph. In some embodiments, the step of retrieving the log data from the private database may include maintaining the transmission of the log data within an environment of the enterprise to reduce a risk of interception by an outside entity.

According to some implementations, the method 560 may operate with a tracking and recording system, which may be configured to continuously track and record end user transactions, network activities, and data traffic. Also, the method 560 may operate with a pre-processing system, which may be configured to analyze the log data, learn patterns about the log data, organize the log data based on predetermined factors, distill insights into the log data, and summarize and store the patterns to enhance searchability. The method 560, in some embodiments, may include the step of storing one or more previously searched queries and one or more suggested queries. The method 560 may also display the one or more previously searched queries and one or more suggested queries on the UI for selection by the authorized user.

In some embodiments, the method 560 may use generative Artificial Intelligence (generative AI) to parse the search request and retrieve the log data. The method 560 may include execution by the UI, an Application Programming Interface (API), and a rule-based engine to process the natural language for interpreting the search request and to filter the search request according to searchable characteristics of the private database. In some cases, the method 560 along with the private database may be incorporated in a cloud-based network security server.

In some embodiments, the database may include security type information (log data) retrieved or logged by a security cloud-based server that monitors the user activity. A querying and displaying engine may be implemented as an API that works with the security software. The log data, in some embodiments, may include records (or counters) having an identifier and a value, wherein the identifier may be configured to identify the user, user's device, or IP address. The value may represent location information.

Divide-and-Conquer Prompt Approach for LLM-Based Text-to-SQL Translation

Additionally, the present disclosure is directed to embodiments related to the specific crafting of prompts that are provided to a Large Language Model (LLM) or other AI model for converting text to SQL scripts for retrieving information from a relational database. By altering a prompt in specific ways, it is possible to achieve better search results in the query systems described herein.

Figure 5:
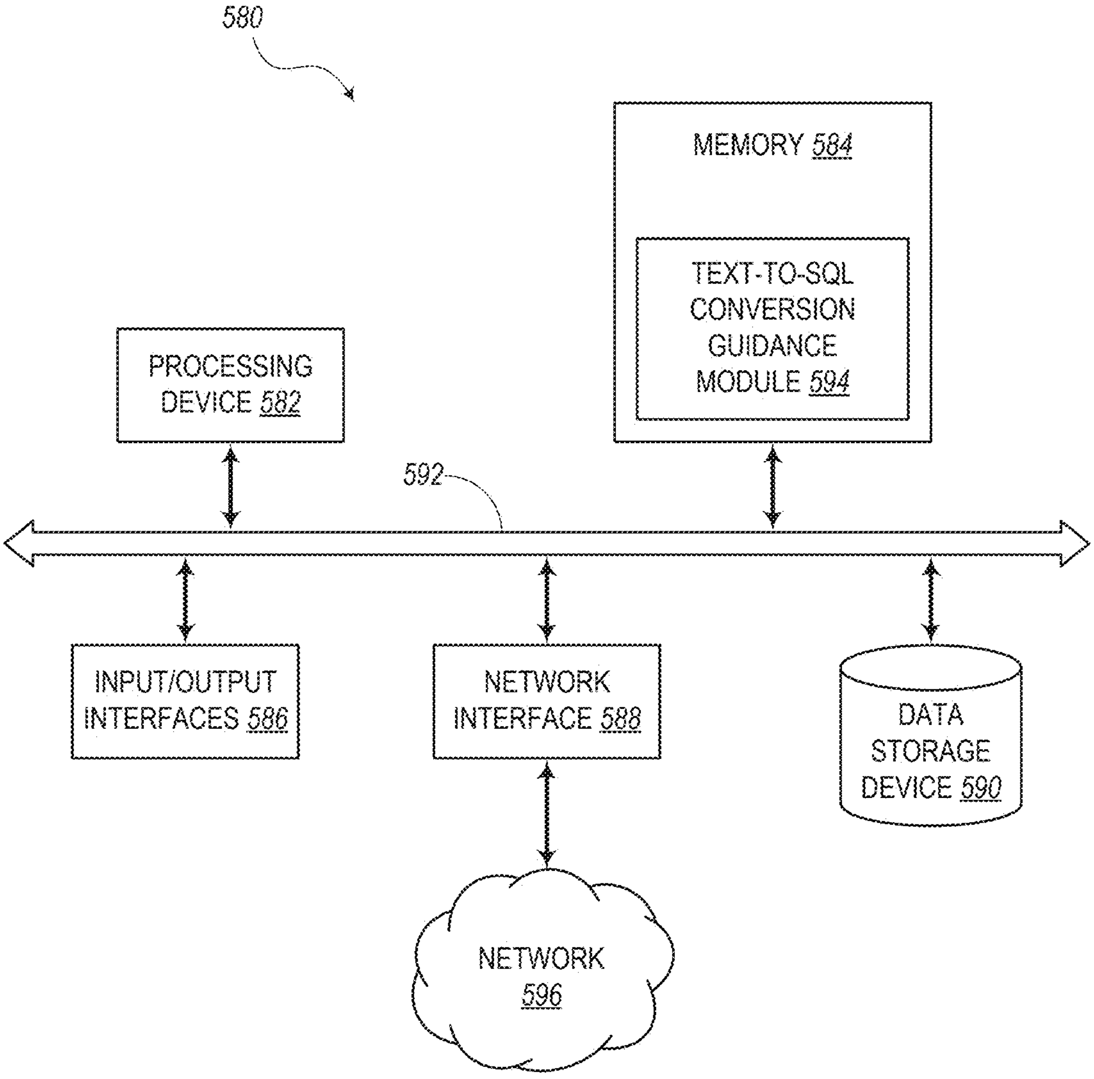
FIG. 5 is a block diagram illustrating an embodiment of a computer system for generating prompts for a text-to-SQL translation system.

FIG. 5 is a block diagram illustrating an embodiment of a computer system 580 for generating prompts for a text-to-SQL translation system. In the illustrated embodiment, the computer system 580 may be a digital computing device that generally includes a processing device 582, memory 584, Input/Output (I/O) interfaces 586, a network interface 588, and a data storage device 590. In some embodiments, the data storage device 590 may be relational database (e.g., relational database 612 shown in FIG. 7) for storing large quantities of data. It should be appreciated that FIG. 5 depicts the computer system 580 in a simplified manner, where some embodiments may include additional components and suitably configured processing logic to support known or conventional operating features. The components (i.e., 582, 584, 586, 588, 590) may be communicatively coupled via a local interface 592. The local interface 592 may include, for example, one or more buses or other wired or wireless connections. The local interface 592 may also include controllers, buffers, caches, drivers, repeaters, receivers, among other elements, to enable communication. Further, the local interface 592 may include address, control, and/or data connections to enable appropriate communications among the components 582, 584, 586, 588, 590.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

The computer system 580 is disclosed herein, comprising a central processing unit (CPU) operatively connected to memory, input/output (I/O) devices, and a network interface. The CPU is configured to execute instructions stored in the memory to perform various computing tasks. The memory may include volatile memory such as random access memory (RAM) for temporary data storage and non-volatile memory such as read-only memory (ROM) for storing essential system instructions.

The computer system 580 further comprises one or more I/O devices facilitating communication with external peripherals and users, including keyboards, mice, displays, printers, and a network interface for communication over a network. The network interface enables data exchange between the computer system and external entities, facilitating connectivity and information transfer.

Additionally, the computer system 580 may incorporate various hardware components and subsystems such as graphics processing units (GPUs), sound cards, and expansion slots for accommodating additional peripheral cards. These components enhance the system's capabilities for multimedia processing, audio/video playback, and expansion options for future upgrades or customizations. Furthermore, a bus interface facilitates communication between different internal components, ensuring efficient data transfer and coordination.

The computer system 580 is also equipped with a power supply unit (PSU) to provide electrical power to all internal components, ensuring proper functionality and operation. The PSU may include voltage regulation mechanisms and safety features to protect against power surges and fluctuations, thereby safeguarding the integrity of the system and connected peripherals.

In conjunction with the hardware components, the computer system 580 includes software components such as operating systems, device drivers, and application programs. These software elements enable the computer to manage hardware resources efficiently, execute user commands, and run various applications tailored to specific tasks or purposes. Additionally, the system may incorporate a database for storing and managing data, providing efficient access and retrieval capabilities.

Overall, the disclosed computer system 580 represents a comprehensive platform for performing computational tasks, facilitating communication, and interacting with users and external devices. Its combination of hardware and software components, including the processor, network interface, database, and bus interface, provides a versatile and scalable computing environment suitable for a wide range of applications across various industries and domains.

The computer system 580 may also include a text-to-SQL conversion guidance module 594, which may be implemented in any suitable combination of hardware, software, and firmware. For example, the text-to-SQL conversion guidance module 594 may be stored in a non-transitory computer-readable medium (e.g., memory 584) and may include logic instructions enabling or causing the processing device 582 to perform various functions as described herein.

FIG. 6 shows an example of a set of related tables 600 used for describing the systems and methods of the present disclosure. The set of related tables 600 includes a store table 602, a product table 604, and a sales_fact table 606. The set of related tables 600 includes information, according to one example, related to different stores in various cities (and regions), different products and brands sold by the stores, and sales figures including sales, cost, and profit information. In the example described in the present disclosure, a user may wish to retrieve certain information from this set of related tables 600. In particular, a query (e.g., question, command, etc.) in natural language may be received from a user. This query can be provided to an LLM, which may be frontend component of a database. The LLM may then be configured to convert the natural language into an SQL script that can be provided to the database for obtaining results (e.g., answer to a question).

Figure 7:
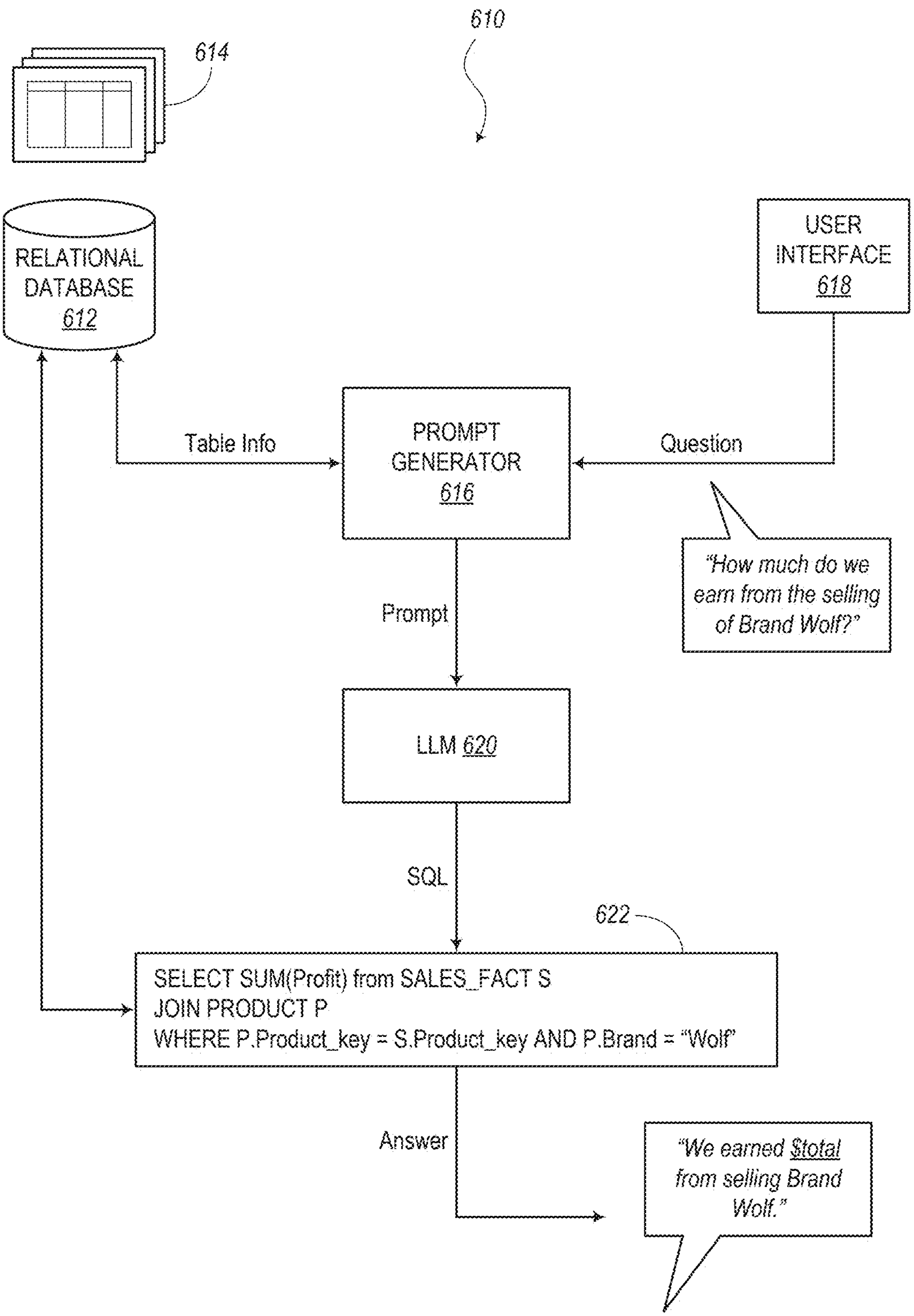
FIG. 7 is a diagram illustrating an embodiment of text-to-SQL system.

FIG. 7 is a diagram illustrating an embodiment of text-to-SQL system 610. In this embodiment, the text-to-SQL system 610 includes a relational database 612 configured to store a plurality of tables 614, a prompt generator 616, a user interface 618, and an LLM 620. The prompt generator 616 may be configured to execute the instructions of the text-to-SQL conversion guidance module 594 by generating a special prompt regardless of the complexity of the question received. The prompt generator 616 may be configured to receive a question from the user interface 618 and add a prompt to instruct the LLM 620 with respect to how to handle the question if it is complex and/or includes cascading dependencies. Thus, the prompt generator 616 may provide intermediate reasoning steps to the LLM 620 to guide the LLM 620 regarding how the question might be processed.

In one example, the question from a user may be "How much do we earn from the selling of Brand Wolf?". The prompt generator 616 may be configured to access the relational database 612 to obtain one or more tables (e.g., the set of related tables 600 of FIG. 6) related to the question. For example, if the text-to-SQL system 610 is configured to perform searches for a particular company or department, the relevant tables and schemas thereof can be retrieved. Next, the prompt generator 616 is configured to craft a prompt that is provided to the LLM 620 to instruct the LLM 620 to handle the questions in a particular way to achieve better answers. Since the general rule of thumb "garbage in, garbage out" can apply to search queries, the prompt generator 616 is able to craft the prompt that would avoid common shortcomings of conventional LLMs and direct the LLM 620 to create a useful SQL script that can be used to achieve an accurate (correct) response or answer to the command or question.

As shown in FIG. 7, the question "How much do we earn from the selling of Brand Wolf?" is considered to be a simple straightforward question. In other words, the answer to this question can be obtained in a linear manner. For example, the LLM 620 may be configured to convert the text of this question into an SQL format, as shown in block 622. This SQL script in block 622 can be applied to the relational database 612 to retrieve the correct answer, such as "We earn a specific amount of money from selling Brand Wolf" where the "specific amount of money" may be replace with an actual monetary amount and is the total amount earned (sum) when referenced with the products that are related to the brand "Wolf" in the brand column of the product table 604, and associated with the respective product keys in the sales_fact table 606. However, it may be noted that some queries are not as simple or straightforward as the example shown in FIG. 7.

Figure 8:
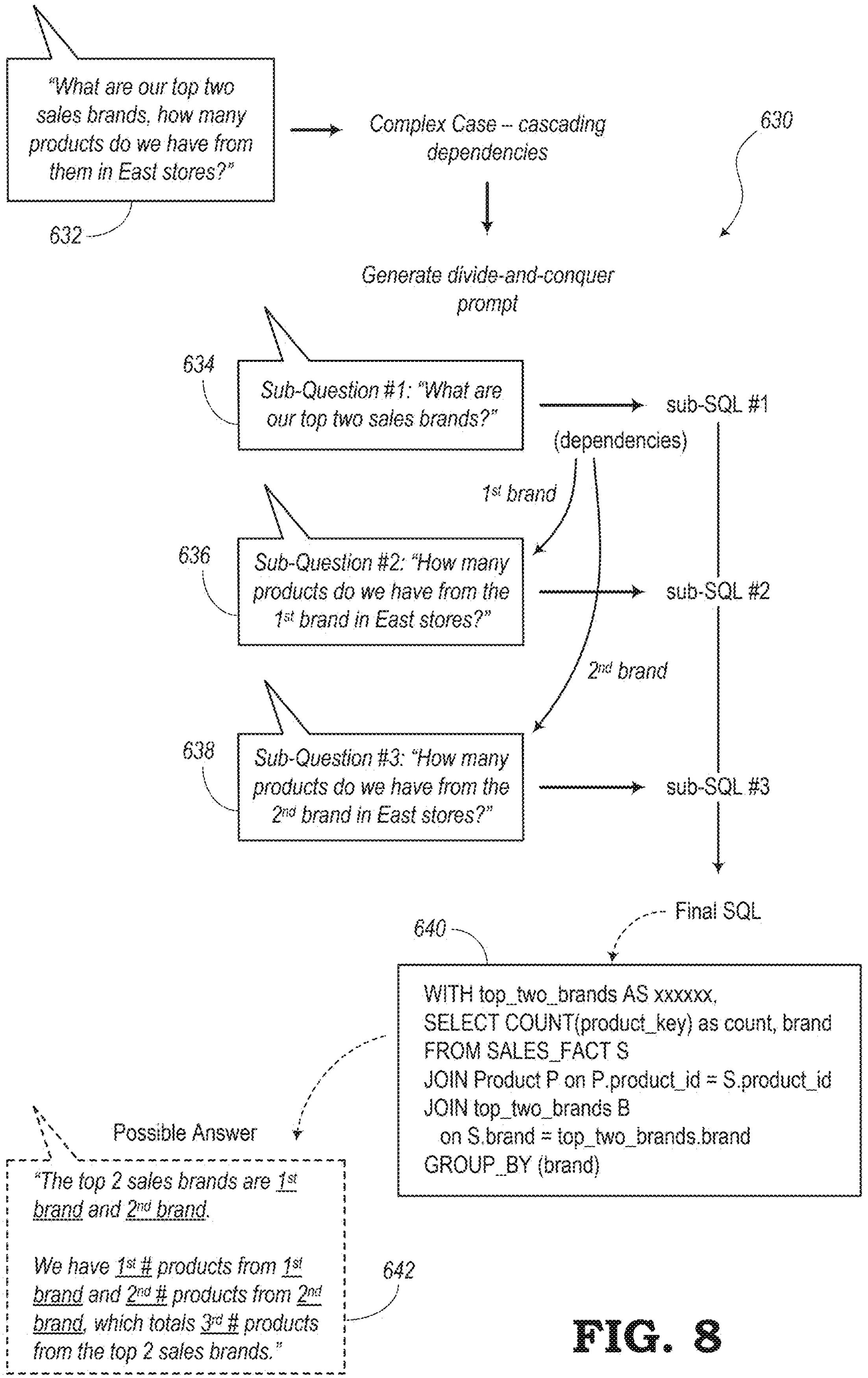
FIG. 8 is a flow diagram illustrating a process for dividing a query into multiple sub-questions to generate an SQL script.

FIG. 8 is a flow diagram illustrating a process 630 for dividing a complex query into multiple sub-questions to generate an SQL script. In this example, a complex question 632 is received from the user interface 618 that reads, "What are our top two sales brands, how many products do we have from them in East stores?" If this simple question, along with the relevant data (e.g., the set of related tables 600), is supplied to the LLM 620 with little or no prompting assistance, the LLM 620 may likely provide the wrong answer because of the complexity of the query. Therefore, as described in the embodiments of the present disclosure, the text-to-SQL conversion guidance module 594 or prompt generator 616 may be configured to include prompt generation functionality that allows for more accurate text-to-SQL creation.

Particularly, when a complex question is received (e.g., one with cascading dependencies), the process 630 includes a divide-and-conquer strategy for generating a divide-and-conquer prompt. As shown in FIG. 8, the original complex question 632 can be divided into three sub-questions, where the first sub-question 634 of "What are our top two sales brands?" is produced. For this first sub-question 634, a first sub-SQL script is produced. It may be noted that the second part of the original complex question 632 include a reference to these top two sales brands (i.e., "how many products do we have from them . . . "). The reliance on the first part of the complex question 632 may be referred to as dependencies, whereby the answer to the second part of the complex question 632 depends on the results of the answer to the first part.

Specifically, the "$1^{st}$ brand" of the "top two sales brands" is forwarded to the second sub-question 636, such that the second sub-question 636 may read, "How many products do we have from the $1^{st}$ brand in East stores?" Also, the "$2^{nd}$ brand" of the "top two sales brands" is forwarded to the third sub-question 638, such that the third sub-question 638 may read, "How many products do we have from the $2^{nd}$ brand in East stores?" The second sub-question 636 can be converted into a second sub-SQL and the third sub-question 638 can be converted into a third sub-SQL.

Next, the prompt generator 616 may further execute the process 630 by combining the multiple sub-SQLs obtained from the multiple sub-questions. As shown in FIG. 8, sub-SQL #1, sub-SQL #2, and sub-SQL #3 can be added or combined together in a logical manner to produce a final SQL 640, which, in this example, is configured for creating a prompt that can provide more accurate results when applied to the LLM 620. For example, one possible answer from the LLM 620 may be, "The top 2 sales brands are $1^{st}$ brand and $2^{nd}$ brand . . . We have $1^{st}$ # products from $1^{st}$ brand and $2^{nd}$ # products from $2^{nd}$ brand, which totals $3^{rd}$ # sum products from the top 2 sales brands." It should be noted that the underlined and italicized portions of the response would be replaced with real data that represents the actual results obtained from the information in the entire informational dataset of the set of related tables 600.

Figure 9:
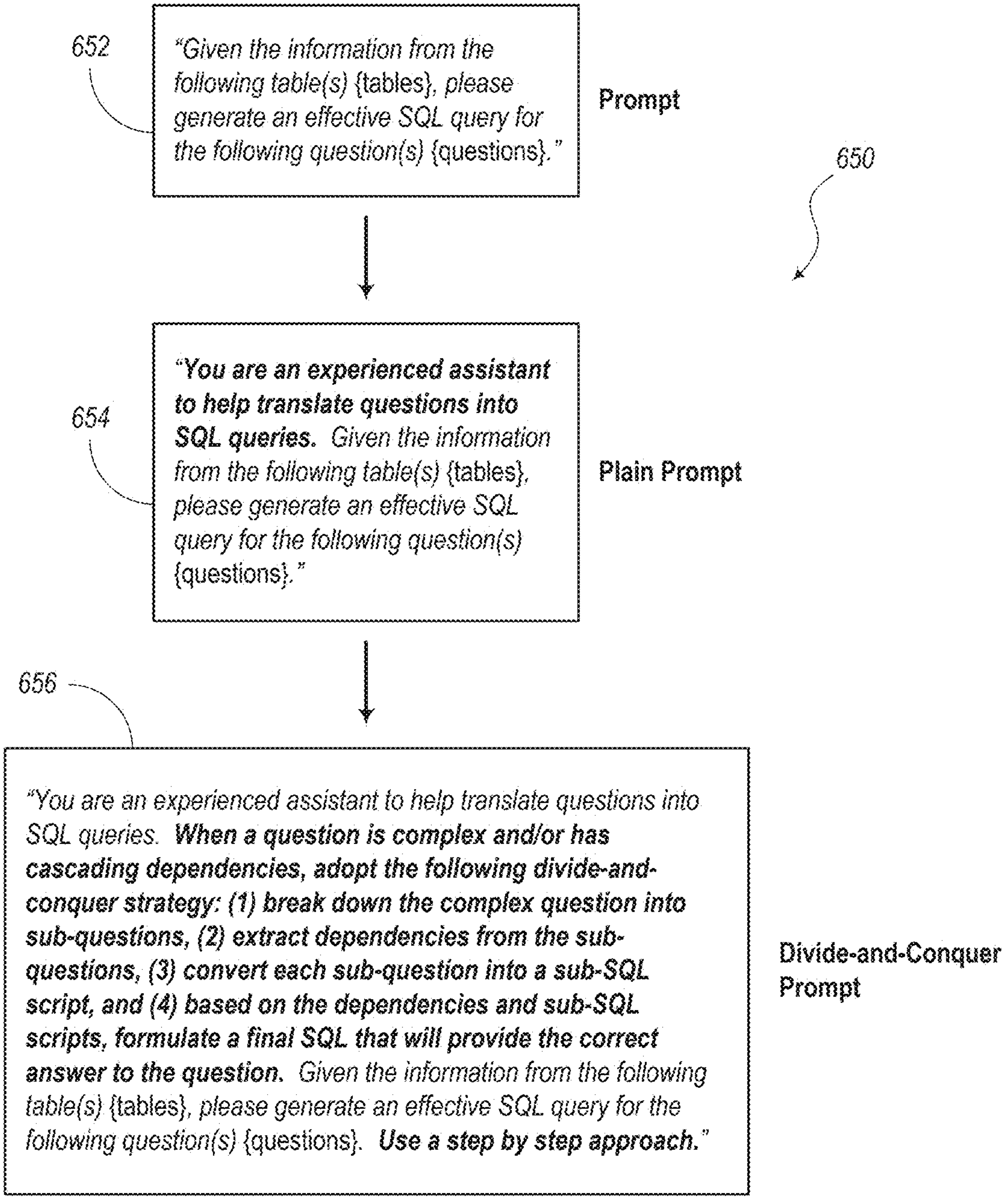
FIG. 9 is a diagram illustrating a progression of prompt engineering for generating an effective prompt for converting text to SQL.

FIG. 9 is a diagram illustrating a progression 650 of prompt engineering, according to various embodiments of the present disclosure, for generating an effective prompt for converting text to SQL. Upon receiving the question from the user interface 618, the prompt generator 616 may be configured to a basic prompt. In the example of FIG. 9, the basic prompt 652 may read, "Given the information from the following table(s) {tables}, please generate an effective SQL query for the following question(s) {questions}." When this response is provided to the LLM 620, the LLM 620 may be able to generate an SQL script from the text to obtain the correct answer from the relational database 612 if the question is simple. However, if the question is more complex, the wrong answer may be provided. Therefore, it may be beneficial to provide additional instruction in the prompt to guide the LLM 620 through more complex questions.

For example, as shown in FIG. 9, another plain prompt 654, which may be slightly more detailed than the basic prompt 652 can be generated by the prompt generator 616. In this case, the plain prompt 654 includes an additional instruction to the LLM 620 that "You are an experienced assistant to help translate questions into SQL queries . . . " This may allow the LLM 620 to provide better results, but still, it might not be able to handle more complex questions.

Thus, the progression 650 as shown in FIG. 9 may include further instructions that can be added in a divide-and-conquer prompt 656. The divide-and-conquer prompt 656 may include the additions from the plain prompt 654 and may also include further instructions that can be used in numerous complex cases where questions, commands, queries, enquiries, etc. may include dependencies or cascading dependencies, where some child results may depend on one or more parent results. The divide-and-conquer prompt 656 may be configured to instruct the LLM 620 to perform intermediate reasoning steps. In this example, the divide-and-conquer prompt 656 may add the instruction reading, "When a question is complex and/or has cascading dependencies, adopt the following divide-and-conquer strategy: (1) break down the complex question into sub-questions, (2) extract dependencies from the sub-questions, (3) convert each sub-question into a sub-SQL script, and (4) based on the dependencies and sub-SQL scripts, formulate a final SQL that will provide the correct answer to the question . . . Use a step by step approach." In some embodiments, the line "Use a step by step approach" may be optional and may be omitted.

Also, it should be noted that the phraseology of each of the prompts described herein are merely examples and can be modified to achieve the same or similar results. Essentially, the generation of prompts may include specific language that may be used in all searches, whereby, in other embodiments, the language may be picked based on the detected complexities of the questions. For example, if a query includes multiple complex questions, it may be beneficial to provide a greater number of instructions to the LLM 620 for obtaining the correct answer.

Figure 10:
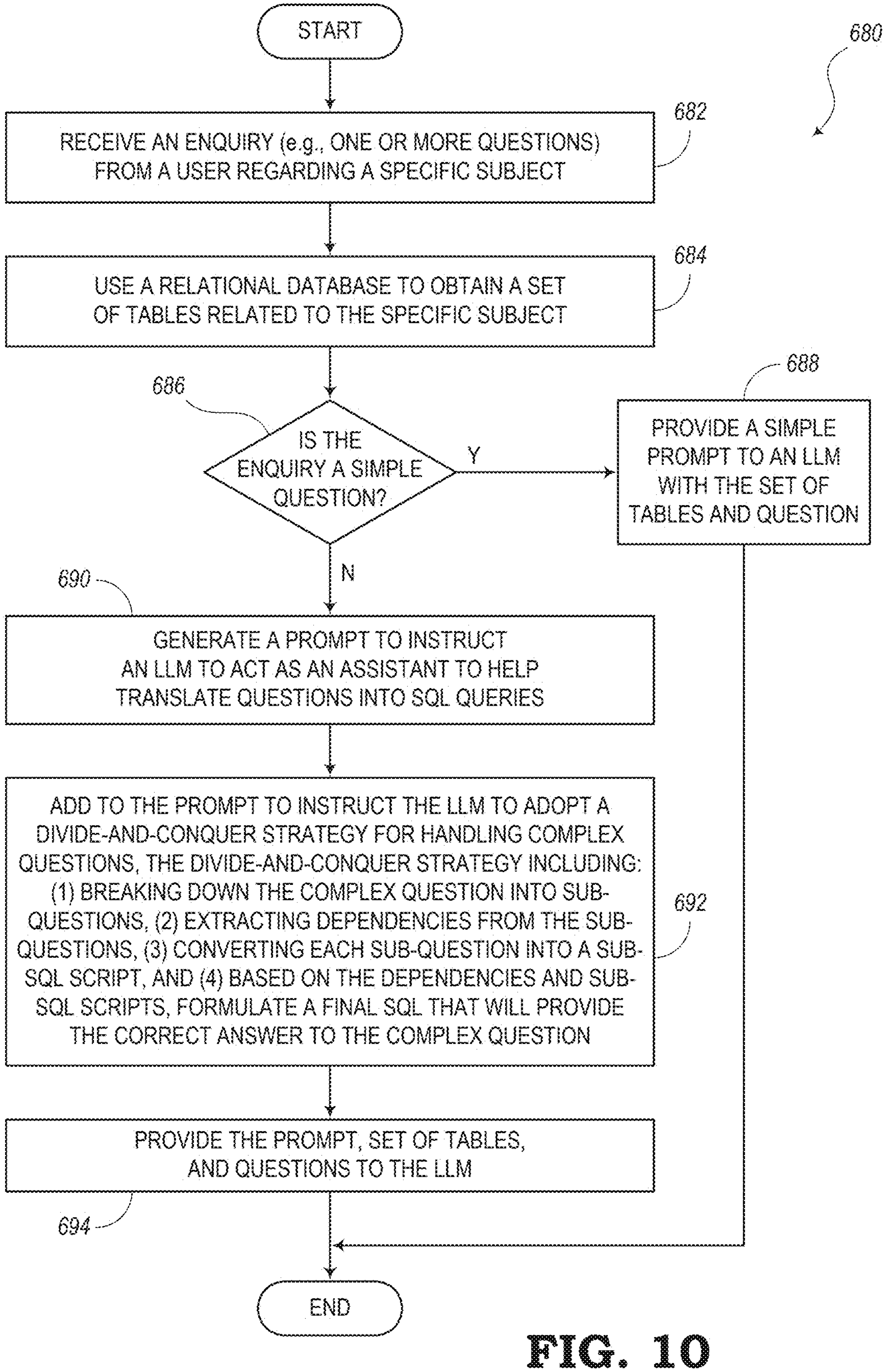
FIG. 10 is a flow diagram illustrating a process for providing a prompt to a Large Language Model (LLM) based on the complexity of an enquiry.

FIG. 10 is a flow diagram illustrating an embodiment of a process 680 for providing a prompt to an LLM based on the complexity of an enquiry. As shown in this embodiment, the process 680 includes a step of receiving an enquiry (e.g., one or more questions) from a user (e.g., user interface 618) regarding a specific subject, as indicated in block 682. For example, the specific subject may be related to the information that is stored in the set of related tables 600 regarding stores, products, and sales figures. Next, the process 680 includes using a relational database to obtain a set of tables related to the specific subject, as indicated in block 684.

The process 680 further includes the step of determining if the enquiry is a simple question, as indicated in condition diamond 686. If the enquiry is simple, the process 680 proceeds to block 688, which includes the step of providing a simple prompt (e.g., basic prompt 652) to an LLM with the set of tables and question and the process 680 ends. Otherwise, if the enquiry is determined not to be simple in condition diamond 686, then the process 680 proceeds to block 690. In block 690, the process 680 includes the step of generating a prompt to instruct an LLM to act as an assistant to help translate questions into SQL queries, which may be related to the plain prompt 654 shown in FIG. 9.

Furthermore, with a complex enquiry, the process 680 is configured to add to the prompt to instruct the LLM to adopt a divide-and-conquer strategy for handling the complex questions, as indicated in block 692. Specifically, the divide-and-conquer strategy may include (1) breaking down the complex question into sub-questions, (2) extracting dependencies from the sub-questions, (3) converting each sub-question into a sub-SQL script, and (4) based on the dependencies and sub-SQL scripts, formulate a final SQL that will provide the correct answer to the complex question. As mentioned in the present disclosure, the addition of this instruction can direct the LLM to handle complex questions in a way where results or answers will be correct. Also, the process 680 includes the step of providing the prompt (final prompt), set of tables, and questions to the LLM, as indicated in block 694, which allows the LLM to perform a text-to-SQL conversion (as instructed) to access the relational database in such a manner that the correct answers or results will be provided to the user's enquiries.

Figure 11:
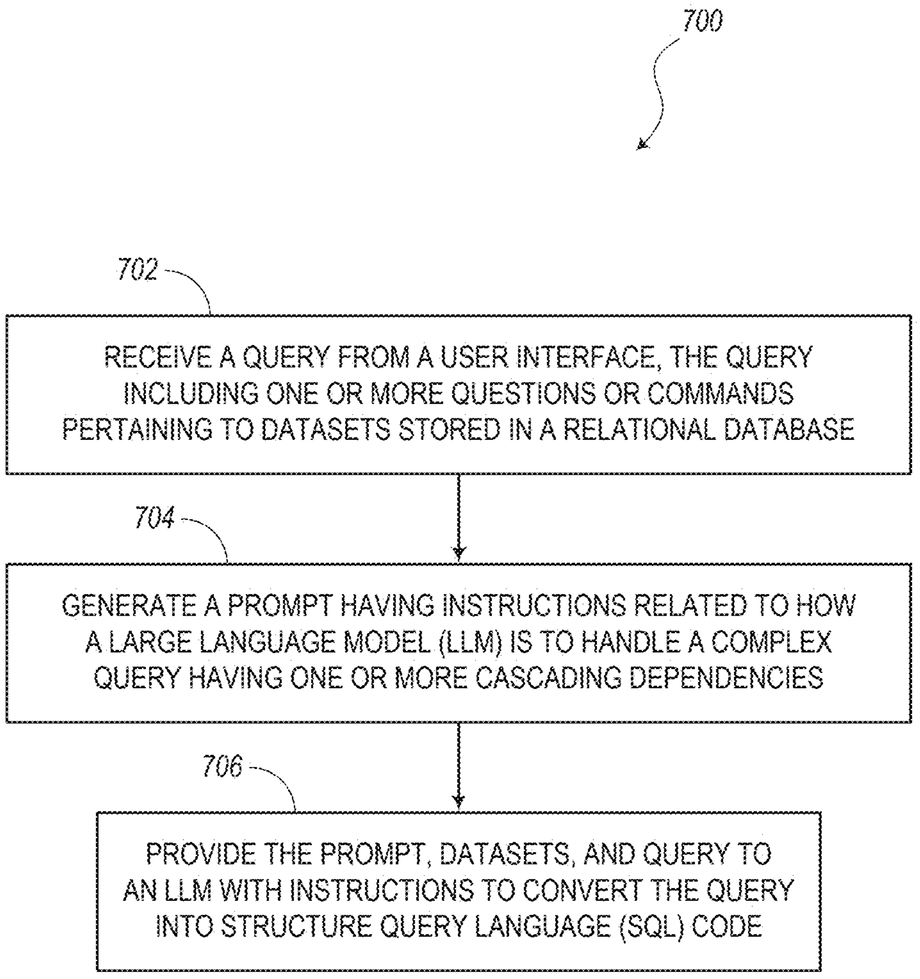
FIG. 11 is a flow diagram illustrating a method for processing a search query.

FIG. 11 is a flow diagram illustrating an embodiment of a method 700 for processing a search query and may be associated with the text-to-SQL conversion guidance module 594 and/or prompt generator 616. In this embodiment, the method 700 includes a step of receiving a query from a user interface, as indicated in block 702, where the query includes one or more questions or commands pertaining to datasets stored in a relational database. Also, the method 700 includes a step of generating a prompt having instructions related to how a Large Language Model (LLM) is to handle a complex query having one or more cascading dependencies, as indicated in block 704. The method 700 further includes a step of providing the prompt, datasets, and query to an LLM with instructions to convert the query into Structure Query Language (SQL) code, as indicated in block 706.

In some embodiments, the LLM may be configured to apply the SQL code to the relational database to obtain one or more answers to the query. The query, for example, may be related to a specific subject, whereby the method 700 may further include a step of obtaining a set of tables related to the specific subject from the relational database.

Also, according to some implementations, the method 700 may further include a step of determining if the query is complex. In response to determining that the query is not complex, the method 700 may further include a step of providing a simple prompt to the LLM. In response to determining that the query is complex, the method 700 may further include a step of adding an instruction to the prompt to direct the LLM to adopt a divide-and-conquer strategy for handling the complex query. For example, the divide-and-conquer strategy may be configured to direct the LLM to a) break down the complex query into sub-questions, b) extract dependencies from the sub-questions, c) convert each sub-question into a sub-SQL script, and d) based on the dependencies and sub-SQL scripts, formulate a final SQL that will provide correct answers to the complex query.

The prompt, for example, may include intermediate reasoning steps to enable the LLM to handle a complex query. The method 700, in some embodiments, may further includes a step of modifying the prompt to instruct the LLM to behave in one or more of the following ways: a) act as expert for translating the query into the SQL code, b) follow a step by step approach, and c) use a Chain of Thought (CoT) technique. Also, the method 700 may include a step of using Natural Language Processing (NLP) on the query received from the user interface.

Additional Information Regarding the Generation of Prompts

Generally, natural language queries may be provided to a backend database. To achieve better search results, however, it may be advantageous to instruct (prompt) the LLM, AI model, Artificial Neural Network (ANN), Generative Pre-trained Transformer (GPT), etc. to focus on specific functions when converting text to SQL commands. Suppose a user within an enterprise wishes to run a report on a large database using a software application (e.g., patent docketing app). Running such a report can be extraordinarily complex. In some cases, the user must be an expert to enter specific commands for retrieving certain information. In a general case, to query a database, the user would need to know how to program in SQL or some other language, which may require expertise. It would therefore be beneficial to improve these conventional applications to allow a user who does not have any particular expertise in computer programming or other related skills to run a simple search within the databases of the enterprise. Hence, the systems and methods described in the following sections are configured to add prompts or instructions for guiding a chatbot, LLM, or other AI model to automatically provide text-to-SQL conversion that can be used to achieve the correct answers to questions (e.g., natural language queries).

One solution may be to front-end an LLM to the database to take in natural language, convert it to SQL (or equivalent language), provide the SQL command to the database, and then provide the results, which is similar to the example of the simple question shown in FIG. 7. Again, this may be considered to be an easy case where there is a simple question which can be easily converted to SQL with little prompting guidance. For example, this simple case may be defined as one where there is a direct correlation between the question and the SQL code. However, it should be noted that many users do not always ask simple questions, but might ask complex questions which trigger cascading dependencies.

For example, a cascading dependency in SQL may be related to the concept of foreign key constraints and how changes in a parent table can automatically trigger changes in a child table. This concept is often used to maintain referential integrity within a database. One type of cascading action is "CASCADE DELETE," which, when a row in a parent table is deleted, any dependent rows in the child table that reference the deleted row in the parent table will also be automatically deleted. Another type of cascading action is "CASCADE UPDATE," which, when a primary key value in the parent table is updated, the corresponding foreign key value in the child table is automatically updated to match the new primary key value in the parent table. To implement cascading actions in SQL, a user may specify ON DELETE CASCADE or ON UPDATE CASCADE options when defining the foreign key constraints. If a row in a parent table is deleted, any rows in a child table that have a parent_id matching the deleted id in parent_table will also be deleted automatically.

In a more complex case, such as in response to receiving the complex question 632 shown in FIG. 8, a problem is that the LLM will often not get the right answer if only the raw question is input. Therefore, one solution, as described with respect to FIGS. 8-10, may include a divide-and-conquer approach to solve complex text-to-SQL translation tasks. The solutions, as described herein, may include Chain of Though (CoT) prompting that can be applied to a query to lead the LLM in the right direction for solving certain types of problems. Often, without this guidance, the LLM may generate logically flawed SQL commands that would output the wrong answers. Thus, the guidance or prompting can be used to train the LLM so that the LLM can generate logically sound SQL code. It may be noted that more examples (e.g., few shot prompting) can be provided in these guidance steps to better train the LLM, but too many may slow down the LLM. Thus, at times, one-shot or zero-shot CoT prompting techniques may be used.

It may be noted that the steps of the text-to-SQL conversion guidance module 594 and/or the functionality of the prompt generator 616 may include various implementations in the field of prompt engineering, which includes giving the LLM instructions (i.e., prompts) along with the raw question to help guide the LLM to provide the correct answer. The divide-and-conquer prompt 656 shown in FIG. 9 shows an engineered prompt that includes specific language (and generally similarly phrased language) for guiding the LLM.

For example, prompt engineering in the context of LLMs (e.g., Generative Pre-trained Transformers (GPTs), etc.) involves the careful crafting of input prompts to effectively guide the model in generating specific, high-quality outputs. This technique is essential because the quality and nature of the input prompt significantly influences the model's response. Prompt engineering can achieve desired results more efficiently and accurately.

Some of key aspects of prompt engineering may include:

1) Clarity and Specificity: Crafting prompts that are clear and specific can greatly improve the relevance and accuracy of the model's responses. Specificity helps in guiding the model to understand the exact nature of the task at hand.

2) Incorporating Instructions or Examples: Including instructions within the prompt or providing examples of the desired output format can help the model generate responses that better align with user expectations. This technique is known as few-shot or zero-shot learning, depending on whether examples are provided.

3) Chain-of-Thought (CoT) Prompting: This involves structuring prompts to encourage the model to "think aloud" or follow a step-by-step reasoning process before providing a final answer. It is particularly useful for complex problem-solving tasks.

4) Temperature and Top-P Adjustments: While not part of the prompt text itself, adjusting parameters like temperature and top-p can influence the creativity and variability of the model's responses. These parameters can be considered tools in prompt engineering to fine-tune output characteristics.

5) Iterative Refinement: Developing effective prompts is often an iterative process. Initial prompts may be tested and refined based on the model's responses, leading to improvements in the quality and relevance of the output over time.

6) Ethical Considerations: Prompt engineers must be mindful of ethical considerations, including avoiding prompts that could lead the model to generate harmful, biased, or inappropriate content. Adjustments to prompts can be made accordingly.

Prompt engineering is both an art and a science, requiring a deep understanding of how LLMs interpret and generate text. As LLMs continue to evolve, prompt engineering remains a dynamic field, with ongoing research and experimentation aimed at unlocking the full potential of these powerful models.

One reason for using the divide-and-conquer strategies and techniques as described herein is that an LLM is much better at breaking down a big task to sub-tasks at textual space than in SQL space. Also, an LLM can yield much higher accuracy when translating a simple question to a SQL query. LLMs are also good at reasoning about the dependencies between different sub-tasks. Furthermore, CoT prompting enables complex reasoning capabilities through intermediate reasoning steps.

Divide-and-conquer in the context of prompt engineering may refer to a strategy for breaking down a complex prompt or problem into smaller, more manageable parts. This approach allows for a more systematic and structured process in understanding, analyzing, and addressing the requirements or objectives of the prompt. By dividing the prompt into smaller components or subtasks, each component can be tackled independently, which can streamline the search process by focusing on solving each component individually, potentially leveraging different techniques or tools tailored to the specific requirements of each part. Once the individual components are addressed, the solutions can be integrated or combined to form a cohesive overall solution (e.g., final SQL 640) to the original prompt. This approach helps in managing complexity and ultimately leads to more effective and comprehensive outcomes.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A non-transitory computer-readable medium configured to store computer logic having directions that, when executed, cause one or more processing devices to:

receive a query from a user interface, the query including one or more questions or commands pertaining to datasets stored in a relational database;

generate a prompt having instructions for a Large Language Model (LLM) to handle the query; and provide the prompt, datasets, and query to the LLM with instructions to convert the query into Structure Query Language (SQL) code, wherein, in response to determining that the query is complex, the prompt includes an instruction directing the LLM to:

break down the complex query into sub-questions including a plurality of sub-questions comprising at least one parent sub-question and at least two child sub-questions;

extract one or more cascading dependencies between the sub-questions by generating a dependency representation identifying, for each child sub-question, a parent result that the child sub-question depends on;

convert each sub-question into a corresponding sub-SQL script; and combine the sub-SQL scripts in accordance with the one or more cascading dependencies to formulate a final SQL code that provides correct answers to the complex query, wherein the final SQL code is a single composed SQL program comprising (i) a first portion corresponding to the parent sub-question, (ii) one or more subsequent portions corresponding to the child sub-questions, and (iii) explicit result-passing in which one or more intermediate results produced by executing the first portion are materialized as one or more intermediate relations and referenced by the one or more subsequent portions.

2. The non-transitory computer-readable medium of claim 1, wherein the LLM is configured to apply the SQL code, formulated based on the sub-SQL scripts, to the relational database to obtain one or more answers to the complex query.

3. The non-transitory computer-readable medium of claim 1, wherein the query is related to a specific subject, and wherein the directions further cause the one or more processing devices to obtain a set of tables related to the specific subject from the relational database.

4. The non-transitory computer-readable medium of claim 1, wherein the directions further cause the one or more processing devices to determine if the query is complex.

5. The non-transitory computer-readable medium of claim 4, wherein, in response to determining that the query is not complex, the directions further cause the one or more processing devices to provide a simple prompt to the LLM.

6. The non-transitory computer-readable medium of claim 4, wherein, in response to determining that the query is complex, the directions further cause the one or more processing devices to add an instruction to the prompt to direct the LLM to adopt a divide-and-conquer strategy for handling the complex query, wherein the divide-and-conquer strategy is configured to direct the LLM to:

a) break down the complex query into the sub-questions, b) extract the cascading dependencies from the sub-questions, c) convert each sub-question into the corresponding sub-SQL script, and d) logically combine the sub-SQL scripts based on the cascading dependencies to formulate a final SQL that will provide correct answers to the complex query.

7. The non-transitory computer-readable medium of claim 1, wherein the prompt includes intermediate reasoning steps to enable the LLM to handle a complex query.

8. The non-transitory computer-readable medium of claim 1, wherein the directions further cause the one or more processing devices to modify the prompt, when handling the complex query having the one or more cascading dependencies, to instruct the LLM to behave in one or more of the following ways: a) act as expert for translating the query into the SQL code, b) follow a step by step approach, and c) use a Chain of Thought (CoT) technique.

9. A system comprising:

a processing device; and memory configured to store a text-to-SQL conversion guidance module having directions that, when executed, enable the processing device to:

receive a query from a user interface, the query including one or more questions or commands pertaining to datasets stored in a relational database, generate a prompt having instructions for a Large Language Model (LLM) to handle the query, and provide the prompt, datasets, and query to the LLM with instructions to convert the query into Structure Query Language (SQL) code, wherein, in response to determining that the query is complex, the prompt includes an instruction directing the LLM to:

break down the complex query into sub-questions including a plurality of sub-questions comprising at least one parent sub-question and at least two child sub-questions;

extract one or more cascading dependencies between the sub-questions by generating a dependency representation identifying, for each child sub-question, a parent result that the child sub-question depends on;

convert each sub-question into a corresponding sub-SQL script; and combine the sub-SQL scripts in accordance with the one or more cascading dependencies to formulate a final SQL code that provides correct answers to the complex query, wherein the final SQL code is a single composed SQL program comprising (i) a first portion corresponding to the parent sub-question, (ii) one or more subsequent portions corresponding to the child sub-questions, and (iii) explicit result-passing in which one or more intermediate results produced by executing the first portion are materialized as one or more intermediate relations and referenced by the one or more subsequent portions.

10. The system of claim 9, wherein the LLM is configured to apply the SQL code, formulated based on the sub-SQL scripts, to the relational database to obtain one or more answers to the complex query.

11. The system of claim 9, wherein the query is related to a specific subject, and wherein the directions further enable the processing device to obtain a set of tables related to the specific subject from the relational database.

12. The system of claim 9, wherein the directions further enable the processing device to determine if the query is complex.

13. The system of claim 12, wherein, in response to determining that the query is not complex, the directions further enable the processing device to provide a simple prompt to the LLM.

14. The system of claim 12, wherein, in response to determining that the query is complex, the directions further enable the processing device to add an instruction to the prompt to direct the LLM to adopt a divide-and-conquer strategy for handling the complex query.

15. The system of claim 14, wherein the divide-and-conquer strategy is configured to direct the LLM to:
a) break down the complex query into the sub-questions,
b) extract the cascading dependencies from the sub-questions,
c) convert each sub-question into the corresponding sub-SQL script, and
d) logically combine the sub-SQL scripts based on the cascading dependencies to formulate a final SQL that will provide correct answers to the complex query.

16. The system of claim 9, wherein the system is a prompt generator configured to provide the prompt to the LLM.

17. A method comprising the steps of:
receiving a query from a user interface, the query including one or more questions or commands pertaining to datasets stored in a relational database,
generating a prompt having instructions for a Large Language Model (LLM) to handle the query, and
providing the prompt, datasets, and query to the LLM with instructions to convert the query into Structure Query Language (SQL) code,
wherein, in response to determining that the query is complex, the prompt includes an instruction directing the LLM to:
break down the complex query into sub-questions including a plurality of sub-questions comprising at least one parent sub-question and at least two child sub-questions;
extract one or more cascading dependencies between the sub-questions by generating a dependency representation identifying, for each child sub-question, a parent result that the child sub-question depends on;
convert each sub-question into a corresponding sub-SQL script; and
combine the sub-SQL scripts in accordance with the one or more cascading dependencies to formulate a final SQL code that provides correct answers to the complex query, wherein the final SQL code is a single composed SQL program comprising (i) a first portion corresponding to the parent sub-question, (ii) one or more subsequent portions corresponding to the child sub-questions, and (iii) explicit result-passing in which one or more intermediate its produced by executing the first portion are materialized as one or more intermediate relations and referenced by the one or more subsequent portions.

18. The method of claim 17, wherein the prompt includes intermediate reasoning steps to enable the LLM to handle a complex query.

19. The non-transitory computer-readable medium of claim 1, wherein the formulating of the SQL code is based on the one or more cascading dependencies, such that a result of one sub-SQL script serves as an input to one or more subsequent sub-SQL scripts, wherein the result is materialized as an intermediate relation within the final SQL code and the one or more subsequent sub-SQL scripts reference the intermediate relation to supply one or more filter values or join keys.

20. The non-transitory computer-readable medium of claim 1, wherein the directions further cause the one or more processing devices to iteratively test and refine the prompt for handling the complex query having the one or more cascading dependencies, based on one or more answers generated from the SQL code, wherein the iterative testing and refinement is further based on user feedback, provided through the user interface, indicating whether the one or more answers are accurate, wherein iteratively testing comprises: (i) executing the final SQL code against the relational database to obtain the one or more answers, (ii) presenting the one or more answers via the user interface, and (iii) receiving, via the user interface, the user feedback indicating accurate or inaccurate; and wherein iteratively refining comprises, in response to the user feedback indicating inaccurate, modifying the prompt to (a) revise at least one of the sub-questions or the dependency links and (b) regenerate at least one corresponding sub-SQL script and the final SQL code.

* * * * *